United States Patent

[11] 3,534,819

| [72] | Inventor | Howard E. Grover<br>342 Lucky Road, Luckey, Ohio 43443 |
|---|---|---|
| [21] | Appl. No. | 754,858 |
| [22] | Filed | Aug. 23, 1968 |
| [45] | Patented | Oct. 20, 1970 |

[54] GROUND WORKING IMPLEMENTS
6 Claims, 5 Drawing Figs.

[52] U.S. Cl............................................... 172/316,
172/328, 172/413, 172/473
[51] Int. Cl........................................................ A01b 63/22
[50] Field of Search............................................ 172/316,
327, 328, 413, 473, 744; 280/414.5, 43.23

[56] References Cited
UNITED STATES PATENTS

| 2,691,930 | 10/1954 | Forgy............................ | 172/413X |
| 2,717,479 | 9/1955 | Scheidenhelm............... | 172/328 |
| 2,729,157 | 1/1956 | Webb............................. | 172/328X |
| 2,732,781 | 1/1956 | Coviello........................ | 172/413X |
| 2,880,528 | 4/1959 | Lusk.............................. | 172/328X |
| 2,967,574 | 1/1961 | Morkoski...................... | 172/413X |
| 3,082,830 | 3/1963 | McKay........................... | 172/328 |
| 3,202,225 | 8/1965 | Richardson................... | 172/328 |

*Primary Examiner*—Robert E. Bagwill
*Assistant Examiner*—Alan E. Kopecki
*Attorney*—Myron E. Click ABSTRACT: In a specific embodiment disclosed herein there is illustrated an implement which includes a frame carrying a plurality of rows of downwardly extending ground working equipment, a forward element for connecting the implement to a motive means, a rear element for connecting the frame to a transport or support means, and a lever system for connecting the forward and rear elements for lowering the rows into full ground working engagement, lifting the forward portion of the frame to permit feathering of accumulated material back beneath the rows, and lifting the frame to free all of the rows from ground engagement for transport of the implement.

INVENTOR.
HOWARD E. GROVER
BY
ATTORNEY

GROUND WORKING IMPLEMENTS

The basic implements have been known in the agricultural industry for years for earth working such as subdividing or breaking up particles or clods or the ground surface as well as agitating and mulching the soil to provide moist soil at planting depth and a top texture rough enough to prevent crusting and erosion.

While the invention herein is applicable to a number of different ground working implements it is particularly applicable to the haul and drag tool implement class, such as the harrow which is described hereinafter. Difficulties have been encountered in the past in transporting harrows or similar implements on the farm or on the highway and in controlling the working depth of the harrow or other implement, particularly where the soil conditions vary in the same field.

Accordingly, it is an object of this invention to provide an improved ground working implement.

It is a further object of this invention to provide an improved ground working implement which may be easily transported between work locations and in which the transporting height and working depth may be controlled from the tractor or other motive means.

It is a still further object of this invention to provide a ground working implement which provides a lift system which enables a feathering of debris accumulated in front of the implement back under the implement by lifting the front end of the implement faster than the rear end thereof.

In carrying out the above objects the invention features a ground working implement which comprises a frame carrying a plurality of rows of downwardly extending ground working equipment such as teeth, discs, rollers, etc. A forward bell crank lever has a forwardly extending arm adapted to be pivotally connected to a motive means such as a tractor, a fulcrum pivotally connected to a forward portion of the frame, and an upwardly extending arm. A rear bell crank lever has a rearwardly extending arm adapted to be pivotally connected to transport means for the frame such as one or more wheels, a fulcrum pivotally connected to a rear portion of the frame, and an upwardly extending arm. A power source such as a hydraulic piston-cylinder assembly or a ratchet jack may be pivotally connected to each of the upwardly extending arms to selectively pull and push the arms toward and away from each other to lift and lower the frame.

Means are provided for reducing the effective leverage of the rear bell crank lever during a first portion of the travel of the upwardly extending arms away from each other whereby the front portion of the frame lifts faster to permit feathering of accumulated material back beneath the rows of ground working equipment. The leverage reducing means may be connected intermediate the upwardly extending arm of the rear bell crank lever and the power source.

The leverage reducing means may advantageously comprise a third bell crank lever having a first arm pivotally connected to the upwardly extending arm of the rear bell crank lever and a second arm adapted for pivotal connection to the power source. Means are provided for retaining the fulcrum of the third bell crank lever means on a line defined by the pivot point of the third and rear bell crank connections and a point on the upwardly extending arm of the front bell crank lever intermediate the fulcrum thereof and its connection to the power source.

The fulcrum retaining means may comprise a slide-guide assembly in which the first arm of the third bell crank lever acts as one of the slide and guide elements of the assembly, and a second element of the assembly acts as the other of the slide and guide elements. The second element has an end free of the slide-guide relationship which is pivotally connected to the fulcrum retaining point hereinbefore described on the upwardly extending arm of the front bell crank lever.

The first arm of the third bell crank lever may advantageously act as a guide to receive the slide element of the assembly. A bracing gusset may be secured between the first and second arms of the third bell crank lever to distribute force applied to the lever and assist in preventing interference or binding in the slide and guide relationship of the slide-guide assembly.

The leverage reducing means is operative during the second portion of the travel of the upwardly extending arms of the first and second bell crank levers away from each other to reduce effective leverage of the front bell crank means thereby permitting the frame to be lifted to a transport position where the rows are in a substantially horizontal alignment with respect to the ground and in which none of the rows engage the ground.

Other objects, advantages and features of this invention will become apparent when the following description is taken in conjunction with the accompanying drawings, in which.

Figure 1:
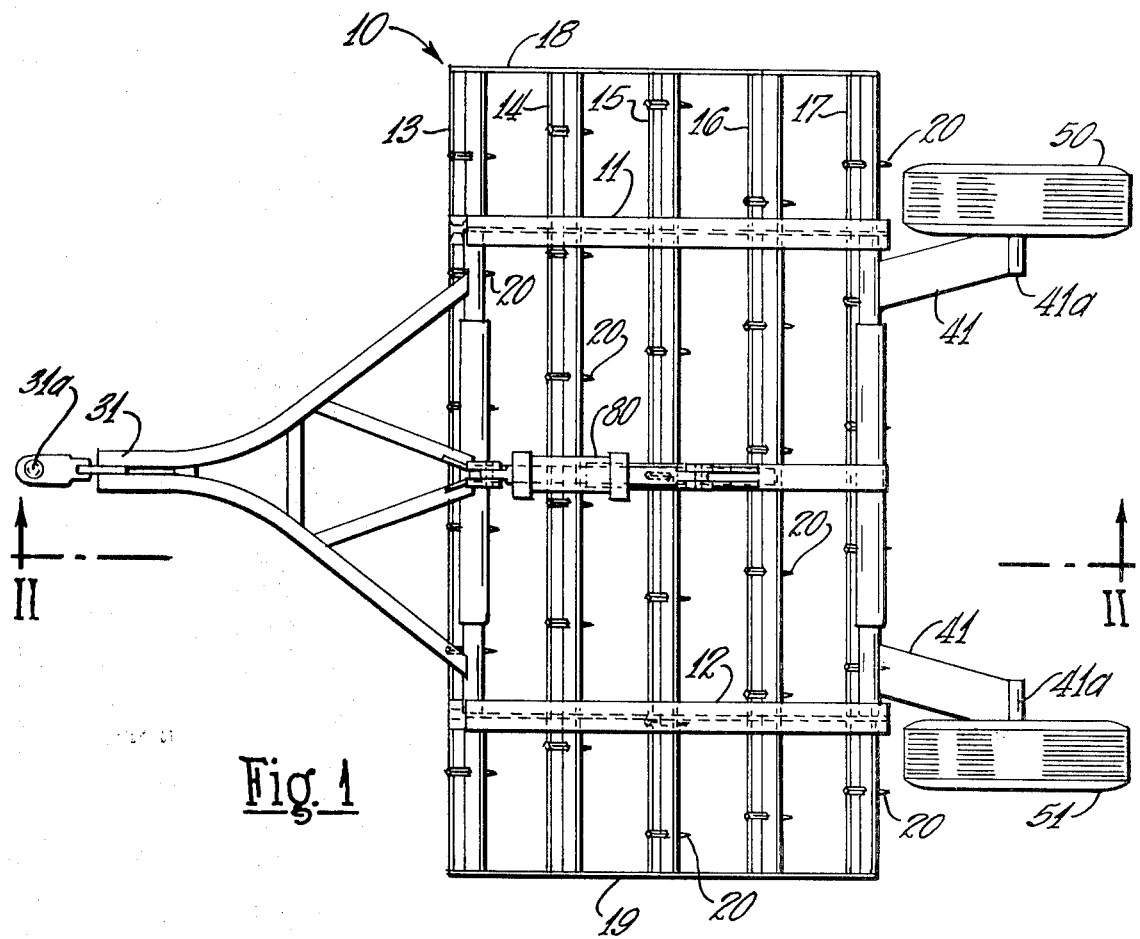
FIG. 1 is a plan view of a ground working implement which embodies the teaching of this invention.

Referring to FIG. 1 there is illustrated in plan view a ground working implement which embodies the teachings of this invention and which comprises a frame generally indicated at 10 which includes longitudinally disposed I-beams 11, 12 which carry transverse members 13, 14, 15, 16, 17 from which teeth 20 extend downwardly to engage and work the ground. Side members 18 and 19 secured to the front transverse member 13, rear transverse member 17, and the intermediate transverse members enhance the rigidity and strength of the frame 10.

Figure 2:
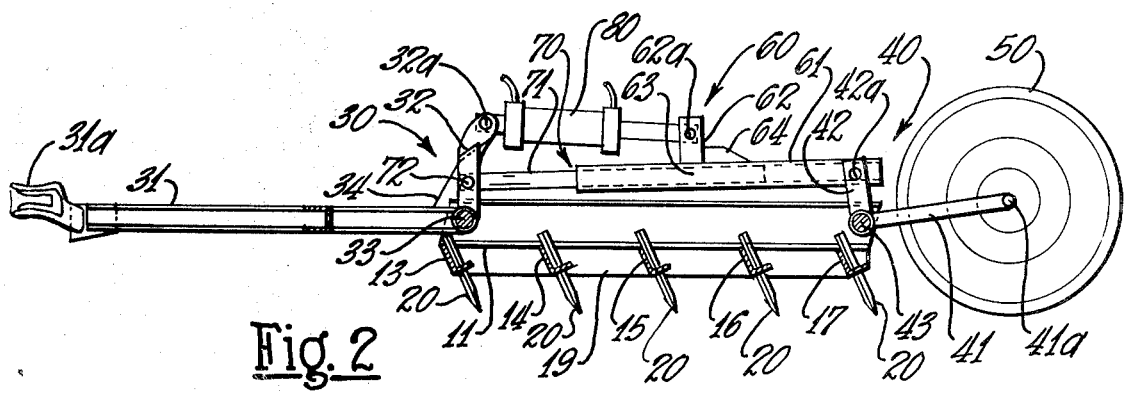
FIG. 2 is a side elevational view of the apparatus of FIG. 1 partially in section taken along lines II–II.

Referring to FIG. 2 it may be seen that a first or forward bell crank lever means generally indicated at 30 has a first forwardly extending arm 31 which may act as a means for pivotally connecting the bell crank lever system 30 to a motive means such as a tractor by the use of the hitch with a pivot point 31a. An axle 33 acts as a fulcrum for the bell crank lever 30 and is journally supported by I-beam members 11 and 12 of the frame 10 at the forward portion thereof above and to the rear of the front edge of the front transverse member 13. A second upwardly extending arm 32 having a pivot point at 32a completes the bell crank assembly 30. A bracing gusset 34 strengthens the assembly.

A rear bell crank assembly is generally indicated at 40 and includes one or more rearwardly extending arms or first arm means 41 adapted to be pivotally connected at 41a to transport or support means for the frame, such as wheels 50, 51. An axle 43 acts as a fulcrum for the bell crank 40 and is pivotally connected or journally supported by I-beam members 11, 12 at the rear portion of frame 10. A second upwardly extending arm 42 having a pivot point at 42a completes the bell crank assembly 40.

A third bell crank assembly or lever means generally indicated at 60 comprises a first forwardly extending arm 61 pivotally connected at 42a to the upright or upwardly extending arm 42 of the rear bell crank lever 40, and a second upright arm 62 adapted for pivotal connection at 62a to a power source 80. A fulcrum 63 of the bell crank lever 60 is defined by the intersection of arms 61 and 62.

The fulcrum 63 or the lower end of upright arm 62 is retained on a line defined by the pivot point 42a, or point of application of force from the power source 80 through element 60 to bell crank 40, and a pivot point 72 on the upwardly extending or upright arm 32 of the front bell crank lever 30, the point 72 being intermediate the fulcrum 33 and its pivotal connection 32a to the power source 80.

The fulcrum retaining means may comprise a slide-guide assembly generally indicated at 70 in which the first arm 61 of the third bell crank lever 60 acts as one of the slide and guide elements of the assembly, and a second element 71 of the assembly acts as the other of the slide and guide elements. The second element 71 has an end free of the slide-guide relationship which is pivotally connected at 72 to the point previously described on the upwardly extending arm 32 of the front bell crank lever 30.

The first arm 61 of the third bell crank lever 60 advantageously acts as a guide to receive the slide element 71. A bracing gusset 64 secured between arms 61 and 62 of the bell crank lever 60 distributes the force applied to the lever, thus strengthening the lever and assisting in preventing interference with the slide and guide relationship of the arm 61 which is formed as a tube to receive the rod 71 in a telescoping, reciprocating relationship.

The third bell crank lever assembly 60 and slide-guide assembly 70 acts as a means for reducing or changing the effective leverage of the rear bell crank lever means with respect to the front bell crank during a first portion of the travel of the upwardly extending arms 32 and 62 away from each other, whereby the front portion of the frame lifts faster to permit feathering of accumulated material back beneath the rows of teeth 20.

The leverage reducing means is further operative during the second portion of the travel of the upwardly extending arms 32, 62 away from each other to reduce or change the effective leverage of the front bell crank means with respect to that applied to the rear bell crank means thereby permitting the frame 10 to be lifted to a transport position where the rows of teeth are substantially horizontal to the ground and clear the ground by a substantial distance to permit transport of the implement.

Figure 3:
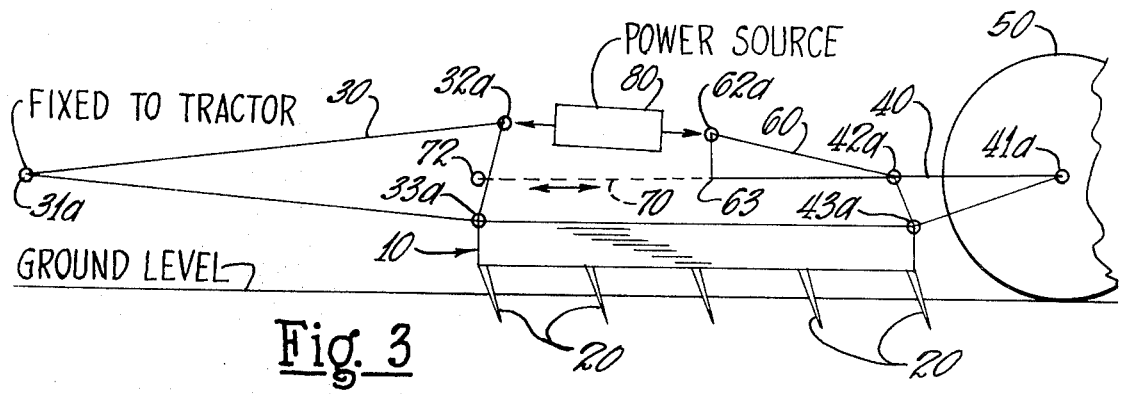
FIGS. 3, 4 and 5 are schematic diagrams illustrating various positions of operation of the apparatus illustrated in FIGS. 1 and 2.
Figure 4:
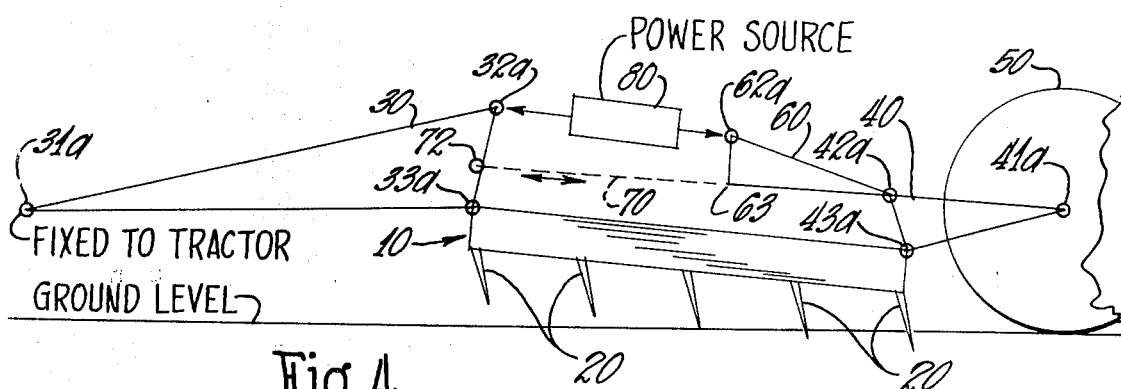
Figure 5:
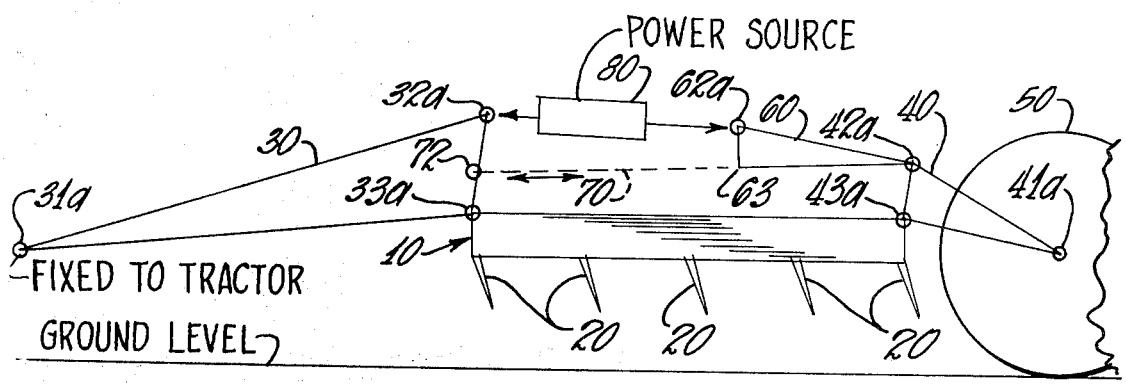

While the invention has been described hereinbefore as a particular arrangement and working relationship of bell crank levers in which the fulcrums are used as normally expected in a bell crank lever system, it is to be understood that the principles apply generally to lever systems which may be more readily understood and perhaps more universally applicable by reference to FIGS. 3, 4 and 5.

In the schematic representations of FIGS. 3, 4 and 5 there is illustrated a ground working implement which comprises a frame 10 carrying a plurality of rows of ground working teeth 20. A first lever element 30 has three pivot points 31a, 32a, 33a, indicated by circles drawn therearound, which define a triangle. The first of the pivot points 31a is adapted for connection to a motive means such as a tractor and is thus fixed at a predetermined relationship with respect to the ground level. A second of the pivot points 33a is pivotally secured to a forward portion of the frame 10.

A second lever element 40 has three pivot points 41a, 42a, 43a also defining a triangle. A first of the pivot points 41a is adapted for connection to a transport means such as a wheel 50. Thus pivot point 41a is maintained a certain height above the ground level when the wheel 50 is in contact with the ground. A second of the pivot points 43a is connected to a rear portion of the frame 10.

Means are illustrated for pivotally connecting the third pivot points 32a and 42a of the first and second lever elements 30, 40 to a reciprocating power source 80 which may selectively pull the third pivot points 32a and 42a closer together to engage the teeth 20 in ground working position and regulate the depth thereof (best seen in FIG. 3), and to push the third pivot points 32a, 42a apart to lift a forward portion of the frame first to permit feathering of accumulated material back beneath the rows of teeth 20 (best seen in FIG. 4) and then to lift all of the frame 10 so that the teeth 20 are in a nonengaging transport position (best seen in FIG. 5).

A lever element 60 having pivot points at 42a and 62a and a fulcrum at 63 has previously been described herein as means for connecting the first and second lever elements 30, 40 to provide more effective leverage to the first lever element 30 during the feathering lift illustrated in FIG. 4. As described, the lever element 60 further provides more effective leverage to the second lever element 40 during the transport lift, the results of which are illustrated in FIG. 5. However, it is possible to attain these lifts and the movements described herein by reference of the teeth 20 with respect to ground level by connections of bell crank levers not illustrated but which are described in principle herein. For example, it is possible to utilize only the first and second bell crank levers 30 and 40 and by the proper selection of their connection to the frame and the length of their respective arms the motions described herein may be attained without the use of the third lever element 60. However, the connection shown utilizing the lever element 60 is most advantageous in power application and fine control of the movement while retaining the size of the bell crank lever elements 30 and 40 within a range which is practical for manufacture and transport and which is attachable to the frame 10 without interference with other operations of the implement or the construction and crating thereof for shipment.

As an example of the rearrangement of bell crank lever components it should be noted in FIGS. 3, 4 and 5 that pivot points 32a and 42a of the lever elements 30 and 40 could be considered fulcrum points rather than the fulcrum points 33a and 43a as illustrated in FIG. 2.

In further defining the schematically illustrated lever system of FIGS. 3, 4 and 5 it will be noted that the means for pivotally connecting the third pivot points 32a, 42a of the first and second elements 30, 40 to a power source 80 includes the third lever element 60 having a first pivot point 42a connected to one of the third pivot points of the first and second lever elements 30, 40 and a second pivot point 62a adapted for pivotal connection to the power source 80, and a fulcrum 63.

The slide-guide assembly 70 illustrated in FIG. 2 and indicated by a dotted line in FIGS. 3, 4 and 5 may be utilized for maintaining the fulcrum 63 of the lever element 60 on a predetermined line of travel defined by a first point 72 which is fixed with respect to the first lever element 30 and a second point, in this instance 42a, which is fixed with respect to the second lever element 40.

The operation of the invention illustrated herein is as follows. In a first action of the lever systems illustrated the frame 10 is lowered so that the teeth 20 engage the ground and the working depth is regulated by energizing power source 80 to pull pivot points 32a and 62a closer together. A second action required from the lever system illustrated herein is to lift the front of the frame 20 (as illustrated in FIG. 4) before the back of the frame 10 so that accumulated soil and debris may be feathered back below the rows of teeth 20 to be spread out over a predetermined distance. The back rows of teeth 20 may or may not be held partially engaged with the ground.

The third action of the lever system illustrated herein is to lift the front and the back of the frame 10 to transport position wherein the teeth 20 are held above the ground level at a sufficient height, for example eight inches, so that the implement may be transferred on the farm or the highway without difficulty. Further, the implement may be moved across ditches or other irregularities in ground surface while moving from one field to another without any problem which might have been encountered heretofore when the ground working implement was simply dragged behind the tractor. This is accomplished by energizing the power source 80 to further push apart or separate pivot points 32a and 62a.

The above operations may be reversed, of course, to take the frame 10 and teeth 20 from the transport position illustrated in FIG. 5 through the feathering position illustrated in FIG. 4 to a fully engaged and regulated working depth position as illustrated at FIG. 3. There is thus provided a smooth ground engaging action since the rear teeth are engaged first and the forward rows are successively engaged.

To illustrate the comparative leverage effect provided by the power source 80 one may extend through pivot points 32a and 62a the forces applied by the power source 80 in FIG. 3. It will be noted that a longer effective moment arm about pivot point 31a is attained in comparison to the moment arm about pivot point 41a. During the portion of the lift between the ground engaging position shown in FIG. 3 and the feathered position shown in FIG. 4, it will be noted that the moment arm about 31a has increased considerably while the moment arm about pivot point 41a has increased only a smaller amount.

When going from the feathered position of FIG. 4 to the transport position of FIG. 5 it will be noted, again by extending the lines of force through pivot points 32a and 62a that the increase in moment arm about pivot point 41a has been substantially increased compared to the increase in moment arm about the pivot point 31a, thus permitting the rear end of frame 10 to be lifted faster than the front end of the frame 10 to provide the transport position illustrated in FIG. 5.

The apparatus disclosed herein may be defined in terms of two interconnected lever systems. First and second lever systems each have three pivot points 31a, 33a, 32a and 41a, 43a, 62a defining a triangle. A first pivot point 31a of one of the lever systems is positioned in front of the frame 10 for connection to a motive means. A first pivot point 41a of the other lever system is positioned to the rear of the frame 10 for connection to a support means 50. The second pivot points 33a, 43a are pivotally secured to the front and rear portions of the frame 10. A reciprocable power source 80 is connected between the third pivot points 32a, 62a. One of the lever systems has a fourth point 42a pivotally connected to and at a fixed distance from each of the other three points 41a, 43a, 62a of that lever system. The movement of the fourth pivot point 42a of the one lever system is restricted to a path defined by a line between the fourth pivot point 42a and a fourth point 72 of the other lever system. The movement restricting means includes the slide-guide assembly 70. Arm 61 maintains the third pivot point 62a at a fixed distance from the line between points 42a, 72.

For defining or describing the overall lever system herein arm 31 may be referred to as the first arm, arm 32 may be referred to as the second arm, arm 42 may be referred to as the third arm, arm 41 may be referred to as the fourth arm, and arm 62 may be referred to as the fifth arm. It is apparent as noted hereinbefore that, within the scope of the invention, modifications and different arrangements may be made other than those specifically herein disclosed to carry out the invention. Different applications of the invention are also apparent. Therefore, the present disclosure is illustrative only, the invention comprehending all variations within its scope.

I claim:

1. An implement comprising a frame carrying downwardly extending ground working equipment; a selectively reciprocable power source; support means for said frame; a forward bell crank lever means having a forwardly extending arm adapted to be pivotally connected to a motive means, a fulcrum pivotally connected to a forward portion of said frame, and an upright arm having an upper end for pivotal connection to said power source; a rear bell crank lever means having a rearwardly extending arm with a rear end for pivotal connection to said support means for said frame and an upright arm, a lower end of said upright arm being pivotally connected to a rear portion of said frame; a third lever means having a first arm pivotally connected at one end to and at the upper end of said upright arm of said rear bell crank lever means and extending forwardly therefrom, and a second upright arm rigidly connected to said forwardly extending arm of said third lever means and pivotally connected at its upper end to said power source; and means connected between said upright arm of said forward bell crank lever means and the lower end of said upright arm of said third lever means for retaining the lower end of said upright arm of said third lever means on a line defined by the pivot connection point of said third lever means and said rear bell crank and a point on said upright arm of said forward bell crank lever means intermediate the fulcrum and the upper end of the upright arm of the forward bell crank means, the pushing apart of the upper ends of the upright arms of the forward bell crank means and the third lever means when the implement is in a ground working position lifting the front part of said frame faster initially to permit feathering of accumulated material back beneath said ground working equipment.

2. An implement as defined in claim 1 in which said means for retaining the lower end of said upright arm of said third lever means on said defined line comprises a slide-guide assembly in which said first arm of said third lever means is disposed along the defined line and acts as one of said slide and guide elements of said assembly, and a second element of said assembly which is also disposed along said defined line acts as the other of said slide and guide elements; said second element having an end free of said slide-guide relationship which is pivotally connected to said intermediate point on said upright arm of said forward bell crank lever means.

3. An implement as defined in claim 2 in which said first arm of said third lever means is formed as a guide to receive said slide element of said assembly, and which further includes a bracing gusset secured between said first and second arms of said third lever means to distribute force applied to said third lever means and assist in preventing interference with said slide and guide relationship of said assembly.

4. A ground working implement comprising a frame carrying downwardly extending ground working equipment; said frame including a front transverse member, a rear transverse member, and means for connecting said front and rear transverse members in spaced relationship; a selectively reciprocable power source; a support means for said frame; a forward bell crank lever means including a fulcrum with a first arm extending forwardly from the fulcrum and a second arm extending upwardly from the fulcrum; means for pivotally connecting the fulcrum of said forward bell crank lever means at the forward portion of said frame above and to the rear of the front of said front transverse member; a rear bell crank lever means including a third arm extending upwardly and a fourth arm extending rearwardly from said third arm; means for pivotally connecting the lower end of said third arm to a rear portion of said frame; means for connecting said support means for said frame to a rear end of said fourth arm; a slide-guide assembly having a first element pivotally connected to an upper end of said third arm, and a second element pivotally connected to said first arm at a point intermediate the ends thereof; a fifth arm connected to and extending upwardly from said first element of said slide-guide assembly; and means for pivotally connecting said selectively reciprocable power source between the upper ends of said second and fifth arms; the operation of said power source to push said upper ends of said second and fifth arms apart when the ground working equipment is engaged with the ground causing said fourth arm to lower a support means for the frame into contact with the ground, the front of the frame to lift before the rear of the frame to enable the feathering of accumulations back beneath the ground working equipment, the lifting of the front of the frame to transport height, and the lifting of the rear of the frame to transport height.

5. Apparatus as defined in claim 4 in which said frame further includes additional transverse members spaced between said front and rear transverse members, and in which said ground working equipment includes a row of teeth extending downwardly from each transverse member.

6. Apparatus as defined in claim 4 in which said first element of said slide-guide assembly comprises a guide tube, and said second element of said slide-guide assembly comprises a rod slidably received in said guide tube; and which further includes a bracing gusset secured between said fifth arm and said guide tube to distribute force applied to said fifth arm and assist in preventing interference with the slide and guide relationship of said rod and tube assembly.